United States Patent
Derbeko et al.

(10) Patent No.: US 9,921,955 B1
(45) Date of Patent: Mar. 20, 2018

(54) FLASH WRITE AMPLIFICATION REDUCTION

(71) Applicant: EMC Corporation, Hopkinton, MA (US)

(72) Inventors: Philip Derbeko, Modiin (IL); Arieh Don, Newton, MA (US); Zvi Gabriel Benhanokh, Tel Aviv (IL); Assaf Natanzon, Tel Aviv (IL); Anat Eyal, Tel Aviv (IL)

(73) Assignee: EMC IP Holding Company, Hopkinton, MA (US)

( * ) Notice: Subject to any disclaimer, the term of this patent is extended or adjusted under 35 U.S.C. 154(b) by 238 days.

(21) Appl. No.: 14/040,953

(22) Filed: Sep. 30, 2013

(51) Int. Cl.
*G06F 13/00* (2006.01)
*G06F 12/02* (2006.01)

(52) U.S. Cl.
CPC .. *G06F 12/0246* (2013.01); *G06F 2212/2022* (2013.01)

(58) Field of Classification Search
None
See application file for complete search history.

(56) References Cited

U.S. PATENT DOCUMENTS

| | | | | |
|---|---|---|---|---|
| 6,401,173 B1 * | 6/2002 | Razdan | ............... | G06F 12/0897 711/122 |
| 6,678,785 B2 * | 1/2004 | Lasser | ................... | G11C 16/10 365/185.33 |
| 7,676,633 B1 * | 3/2010 | Fair | ..................... | G06F 12/0897 711/122 |
| 8,364,924 B2 * | 1/2013 | Belluomini | ......... | G06F 12/0868 711/103 |
| 2014/0379990 A1 * | 12/2014 | Pan | ..................... | G06F 12/0871 711/135 |

* cited by examiner

*Primary Examiner* — Idriss N Alrobaye
*Assistant Examiner* — Richard B Franklin
(74) *Attorney, Agent, or Firm* — Krishnendu Gupta; Konrad R. Lee

(57) ABSTRACT

A computer-executable method, system, and computer program product for managing a flash cache module in a data storage system, wherein the data storage system is in communication with a data storage array, the computer-executable method comprising receiving a request to write a first data block to the flash cache module; analyzing the flash cache module to determine if there is a free portion of memory on the flash cache module for the first data block; and upon a negative determination, writing the first data block to a used portion of memory on the flash cache module.

15 Claims, 8 Drawing Sheets

FLASH WRITE AMPLIFICATION REDUCTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a flash cache module in a data storage system, wherein the data storage system is in communication with a data storage array, the computer-executable method comprising receiving a request to write a first data block to the flash cache module; analyzing the flash cache module to determine if there is a free portion of memory on the flash cache module for the first data block; and upon a negative determination, writing the first data block to a used portion of memory on the flash cache module.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
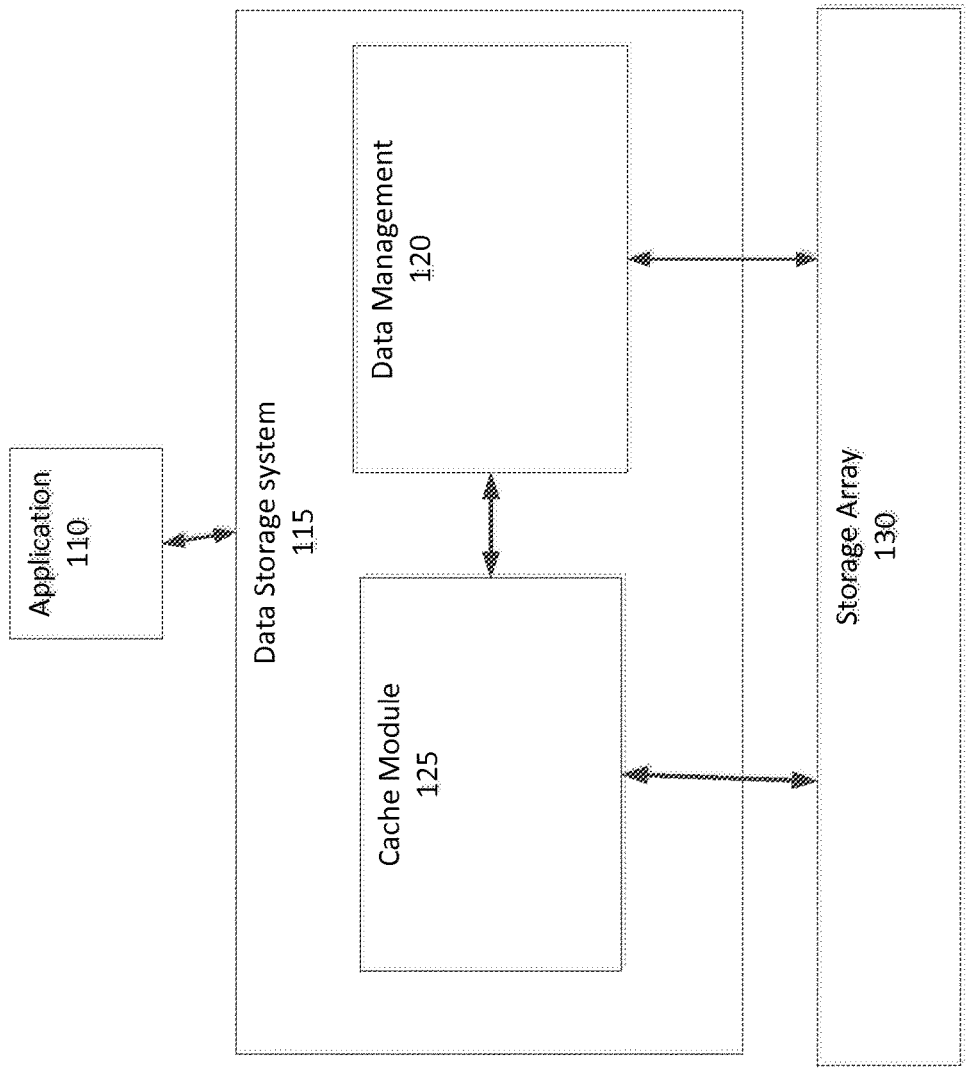
FIG. 1 is a simplified illustration of a data storage system, in accordance with an embodiment of the present disclosure.

Traditionally, hard drives in data storage systems are making a transition from rotational hard drives to flash devices. Typically, while flash devices are faster than rotational hard drives, flash devices suffer from different wear and tear problems than rotational hard drives. Generally, rotational hard drives may be written to and read from endlessly as long as the rotational portion of the hard drive is in good working order. Traditionally, flash devices are faster than rotational hard drives and may be read from limitlessly, however, flash devices suffer from being limited to a finite number of writes to each memory location on a flash device. Generally, solutions to improve the life and/or performance of a flash devices used in a data storage system would be useful and may not have been previously possible.

Traditionally, write amplification is a side-effect of using flash devices. Generally, when writing to a flash device, big chunks of flash have to be erased before any data is written to the flash device. Typically, when a flash device receives a write from a host application, the flash device executes multiple reads and writes to complete the initial write request. Generally, as a flash device becomes filled, the amplification effect of each write is greater. Traditionally, when a portion of data is written to a flash device, the data management module searches for a block of memory large enough to accommodate the portion of data. Typically, if a block of memory cannot be found for a portion of memory, the data management system makes space on a flash device. Generally, a data management system makes space on a flash device by moving and/or consolidating data currently stored on the flash device. Typically, moving data on a flash device means executing at least one extra read and write per every write to the flash device. Generally, in a worst case scenario, a flash device can make hundreds of writes to complete a single write requested by a host application to a flash device.

Traditionally, flash device problems resolve themselves to a few issues. Typically, a flash device has a limited number of writes that can be made to each memory location on the flash device. Generally, while reads from a flash device are quick, writes to a flash device are slow. Traditionally, when an application attempts to write large blocks onto a flash device and/or when a flash device becomes full, a data management system has difficulty finding continuous pages of memory to write to. Typically, when continuous pages of memory are not available, data management software attempts to move and/or consolidate data to free up storage space on a flash device. Generally, data management attempts to be efficient by fully utilizing all available memory locations within a flash data storage device. Traditionally, each issue mentioned above compounds the problem of each flash device having a limited number of writes and that each write is relatively slow.

In many embodiments, the current disclosure may enable an extension of life for flash devices used in data storage systems. In various embodiments, the current disclosure may enable a flash device to last longer while being used as flash cache within a data storage system. In certain embodiments, the current disclosure may enable a host application to make the fastest write to a flash device available to the host application.

In many embodiments, a data management module may notify flash card firmware that the flash card may be working in caching mode and that data may not be moved for chunk erasure. In various embodiments, when a write request is made to a flash card and a new chuck may need to be erased, the flash card may pick a chunk of memory according to a flash caching algorithm. In certain embodiments, data may not be moved out of a chunk of memory before erasure. In other embodiments, a flash card may notify a data management module as to what data may be erased in response to a write command.

In many embodiments, read requests to portions of a flash card that may have already been erased may be failed by the flash card until the data management module acknowledges a receipt of the erased data. In various embodiments, a data management module may mark erased data as invalid and may re-read the data from primary storage in the background. In certain embodiments, some of the re-read data may be evicted by flash caching algorithms making a data re-read unnecessary. In other embodiments, background reads from primary storage may be performed using low-priority reads to avoid interfering with application I/O. In some embodiments, a data management module may be able to supply a flash card a list of flash areas that should not be erased and/or coalescing of re-written data and others.

Refer to the example embodiment of FIG. 1. FIG. 1 is a simplified illustration of a data storage system, in accordance with an embodiment of the present disclosure. As shown, Data storage system 115 includes data management module 120 and flash cache module 125. Data storage system 115 is enabled to communicate with data storage array 130. Application 110 is enabled to store data and/or data I/Os on data storage array 130 through data storage system 115. In this embodiment, data storage system 115 utilizes flash cache module 125 to cache data and/or data I/Os stored on data storage array 130 by application 110.

Figure 2:
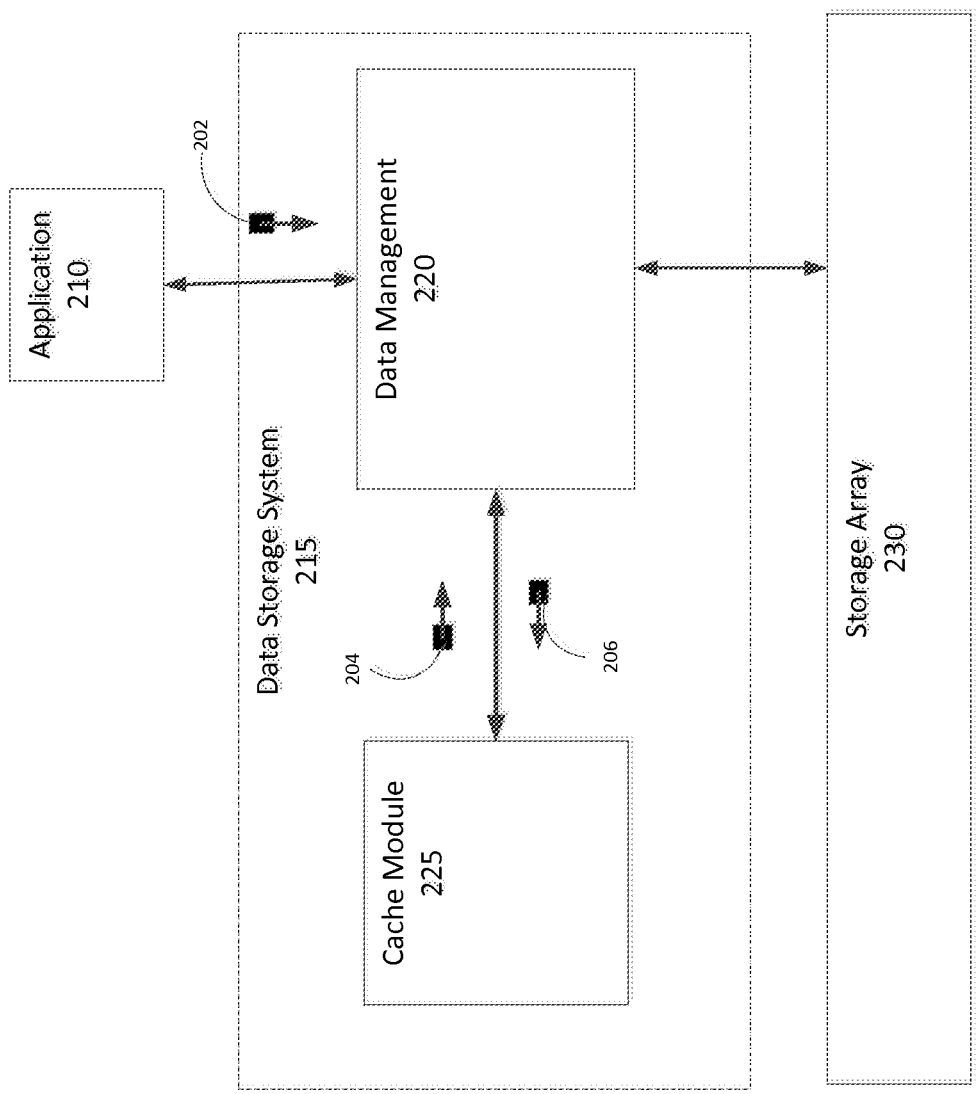
FIG. 2 is a simplified illustration of an application writing data to a data storage system, in accordance with an embodiment of the present disclosure.

Refer now to the example embodiment of FIG. 2. FIG. 2 is a simplified illustration of an application writing data to a data storage system, in accordance with an embodiment of the present disclosure. As shown, Data storage system 215 includes data management module 220 and flash cache module 225. Data storage system 215 is enabled to communicate with data management 220. Application 210 is enabled to communicate data I/Os to data storage system 215 using message 202. Message 202 is enabled to include one or more data read requests and/or one or more data write requests. In this embodiment, data management module 220 receives message 202 containing a write request. Data management module 220 sends data write request to flash caching module 225 using message 206. Flash caching module 225 selects a portion of memory on flash caching module 225 to write received write request in message 206. If flash caching module has a block of free contiguous space for the write request, flash caching module writes the write request and returns to data management 220 a success flag in message 204. If flash caching module does not have a block of free continuous space for the write request, flash caching module 225 chooses a location. Flash caching module 225 determines whether completing write request will overwrite data currently stored on flash caching module 225 and places the overwrite data in message 204. Flash caching module 225 writes the write request and sends message 204 to data management module 220. In this embodiment, data management module stores the overwrite data in message 204. In many embodiments, the data management module is enabled to queue the overwritten data to be refreshed at a later time. In various embodiments, the data management module is enabled to direct a flash cache module to rearrange the memory on the flash cache to accommodate overwritten data. In certain embodiments, the data management module may be enabled to determine if the overwritten data may no longer be good and/or needed on cache. In some embodiments, when a determination that overwritten data may no longer be good and/or needed, the data management module may be enabled to toss overwritten data from flash cache instead of queuing for re-caching. Data management module 220 returns a success flag to application 210 and completes the write request.

Figure 3:
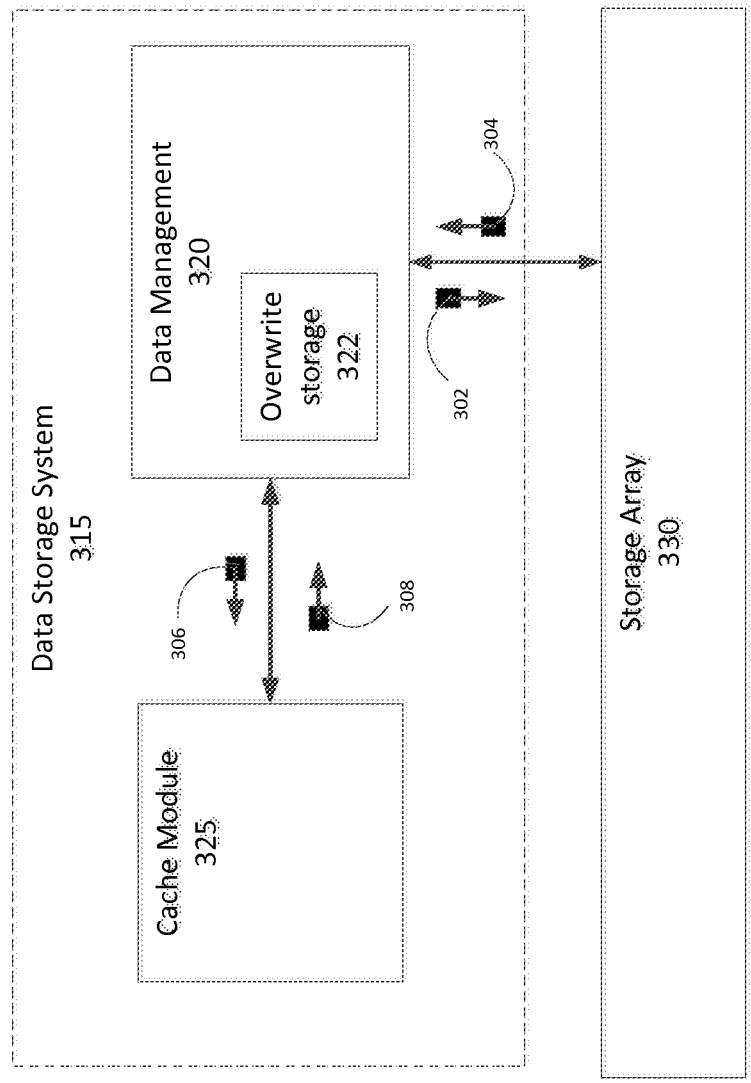
FIG. 3 is a simplified illustration of a data management module completing background updates to a flash caching module, in accordance with an embodiment of the present disclosure.

Refer now to the example embodiment of FIG. 3. FIG. 3 is a simplified illustration of a data management module completing background updates to a flash caching module, in accordance with an embodiment of the present disclosure. As shown, data storage system 315 includes data management module 320 and caching module 325. Data storage system 315 is enabled to communicate with data storage array 330. In this embodiment, data management module 320 includes overwrite storage 322. Overwrite storage 322 is enabled to store which data was overwritten during previous writes to flash caching module 325. In various embodiments, overwrite storage may be stored references to overwritten data. In certain embodiments, overwrite storage may include overwritten data stored in memory until data management may be enabled to process overwritten data. Data management 320 uses information stored in overwrite storage 322 to determine what data from data storage array 330 to refresh on flash caching module 325. Data management 320 sends a flash caching request in message 302. Data storage array 330 processes message 302 and returns requested data in message 304. Data management 320 receives the data in message 304 and forwards the data to flash caching module 325 in message 306. Flash caching module 325 determines whether a free block of memory is available on flash caching module 325 for data in message 306. If a data block is available, flash caching module 325 writes the data to memory on flash caching module 325. If a data block is not available, flash caching module 325 chooses a location to write the data in message 306 and overwrites data. Flash caching module 325 writes data from message 306 to memory and forwards overwritten data to data management 320 in message 308. The process continues until overwrite storage 322 is empty and/or flash caching module 325 is full.

Figure 4:
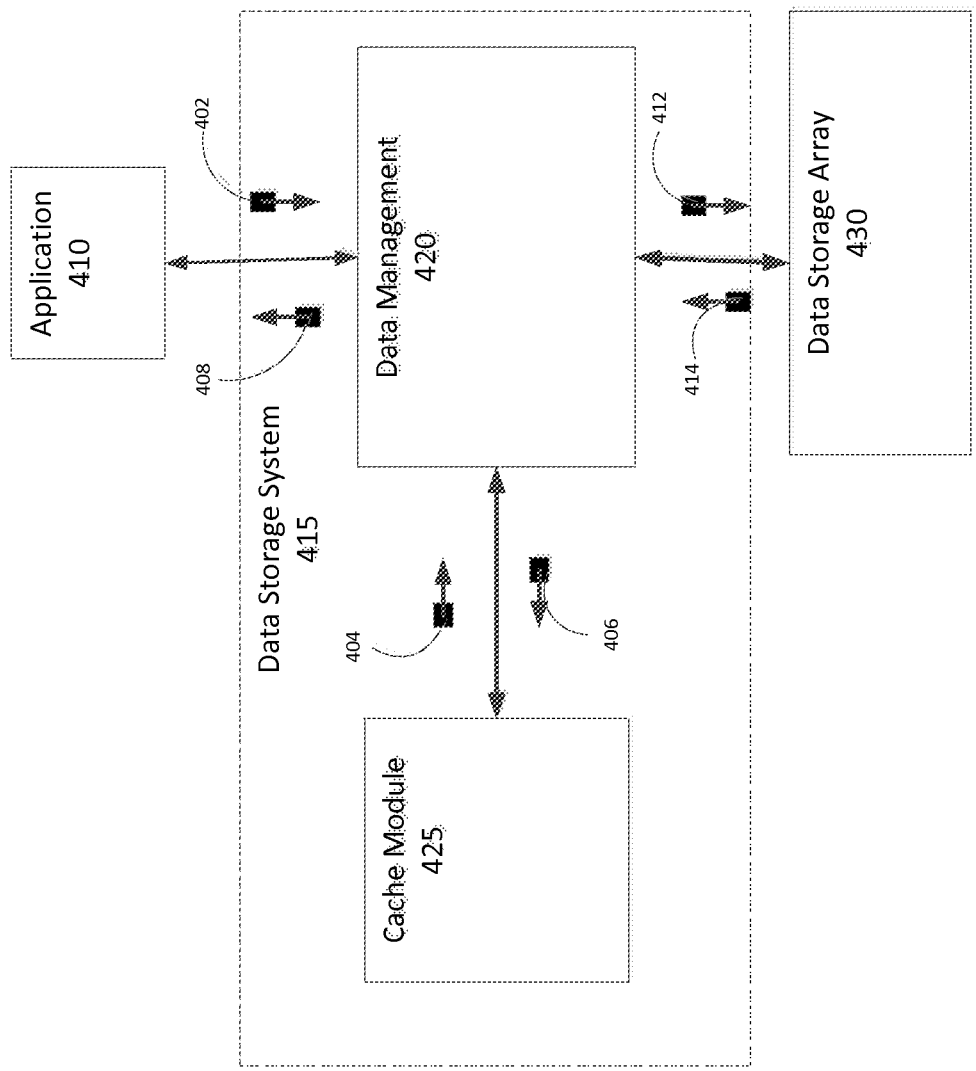
FIG. 4 is a simplified illustration of an application making a read request from a data storage system, in accordance with an embodiment of the present disclosure.

Refer now to the example embodiment of FIG. 4. FIG. 4 is a simplified illustration of an application making a read request from a data storage system, in accordance with an embodiment of the present disclosure. As shown, application 410 makes a read request to data storage 415 using message 402. Data management 420 receives message 402 and forwards the read request in message 406. Flash caching module 425 determines if requested data is in memory on flash caching module 425. If flash caching module 425 determines that the data requested in message 406 is in memory, flash caching module 425 returns requested data in message 404 to data management module 420. In this embodiment, Data management module 420 returns requested data to application 410 in message 408.

If flash caching module 425 determines that the data requested is not in cache, flash caching module 425 returns a cache missed flag to data management module 420 in message 404. Data management module 420 makes a secondary data request to data storage array 430 in message 412. Data storage array 430 receives data read request and returns requested data in message 414. In this embodiment, after data management module 420 receives requested data from data storage array 430, data management module sends requested data to application 410 using message 408.

Figure 5:
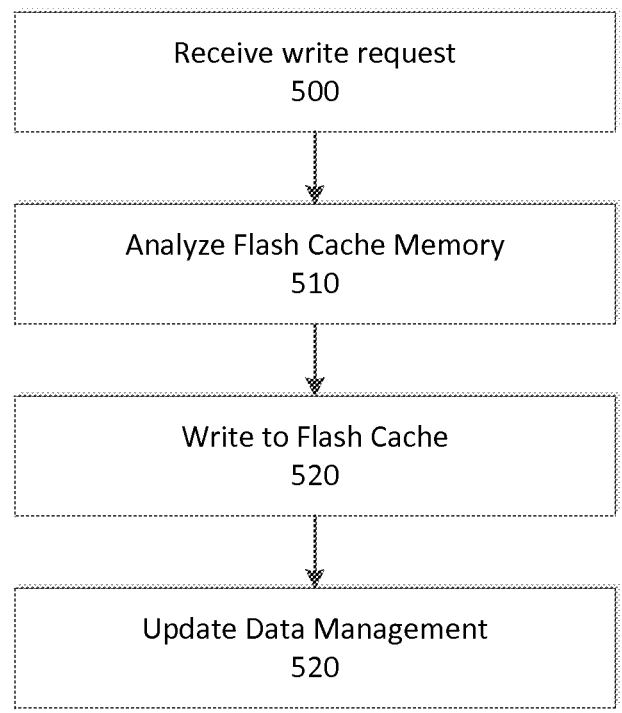
FIG. 5 is a simplified flowchart of a method of writing to a data storage system, in accordance with an embodiment of the present disclosure.

Refer now to the example embodiment of FIGS. 2 and 5. FIG. 5 is a simplified flowchart of a method of writing to a data storage system, in accordance with an embodiment of the present disclosure. As shown, data storage system 215 includes data management module 220 and flash caching module 225. Data management module 220 receives write request from application 210 in message 202 (Step 500). Data management module 220 sends write request to flash caching module 225 in message 206. Flash caching module 225 receives write request and analyzes flash cache memory (Step 510) to determine where to write the data in the write request. Flash cache module 225 determines whether memory will be overwritten in processing the write request. Flash caching module 225 writes to memory (Step 520) and updates data management module 220 (Step 520) using message 204. Flash caching module 225 is enabled to return a success flag and/or populate message 204 with overwritten data information. Data management module 220 receives message 204 and processes the contents. If data management module 220 receives overwritten data information, data management module 220 stores the overwritten data information for use in refreshing the flash caching module at a later time.

Figure 6:
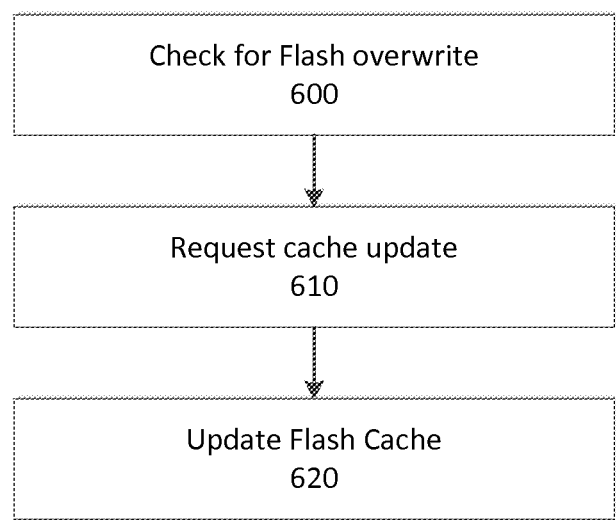
FIG. 6 is a simplified flowchart of a method of refreshing a flash caching module, in accordance with an embodiment of the present disclosure.

Refer now to the example embodiment of FIGS. 3 and 6. FIG. 6 is a simplified flowchart of a method of refreshing a flash caching module as shown in FIG. 3, in accordance with an embodiment of the present disclosure. As shown, data storage system 315 includes data management module 320 and flash caching module 325. Data storage system 315 is in communication with data storage array 330. In this embodiment, data management module 320 checks overwrite storage 322 for any overwritten information (Step 600). If overwritten information exists, data management module 320 requests a flash cache update (Step 610) from data storage array 330. Data storage array 330 forwards overwritten data to Data management module using message 304. Data management module 320 updates flash caching module 325 with data received from data storage array 330 (Step 620).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
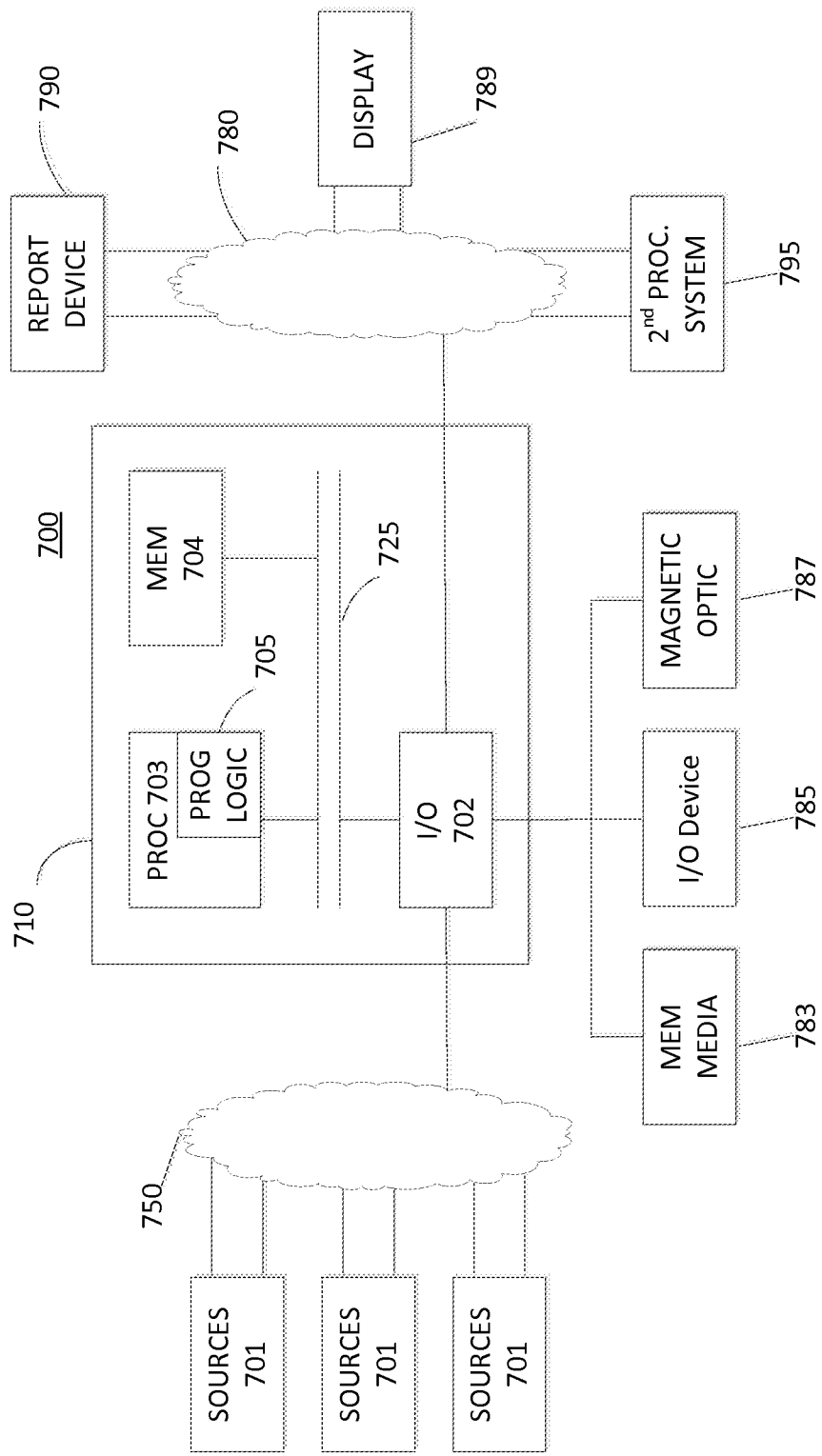
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O devices 785, and drives 787, such as magnetic or optical drives. When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
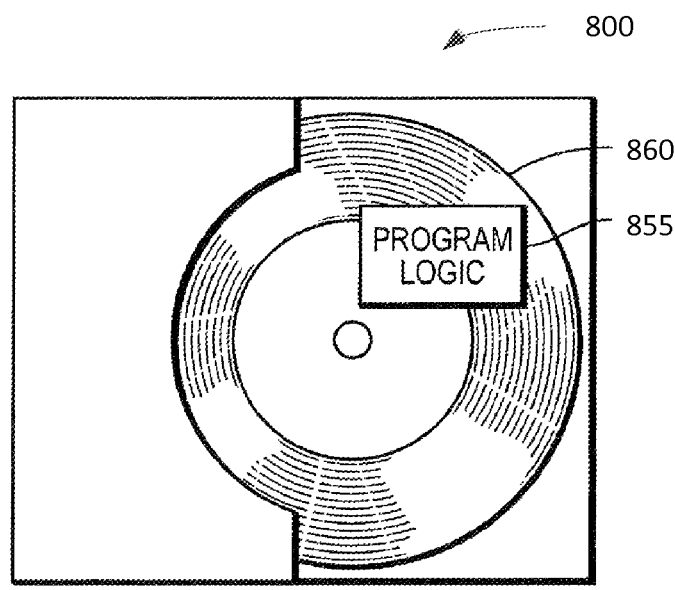
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows Program Logic 855 embodied on a computer-readable medium 860 as shown, and wherein the Logic is encoded in computer-executable code configured for carrying out the methods of this invention and thereby forming a Computer Program Product 800. Program Logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a flash cache module in a data storage system, wherein the data storage system is in communication with a data storage array, the computer-executable method comprising:
designating which portions of the flash cache module are enabled to be overwritten during management of the flash cache module;
receiving a request to write a first data block to the flash cache module;
analyzing the flash cache module to determine if there is a free portion of memory on the flash cache module for the first data block;

upon a negative determination, writing the first data block to a used portion of memory on the flash cache module, wherein the data in the used portion of memory is overwritten by the first data block without destaging the used portion of memory;

notifying the data storage system that the used portion of memory on the flash cache module was overwritten; and storing references to overwritten data of the flash cache module to overwrite storage;

analyzing the references to overwritten data to determine which portions of overwritten data will be scheduled to be cached again.

2. The computer-executable method of claim 1, further comprising upon a positive determination, writing the first data block to the free portion of memory.

3. The computer-executable method of claim 1, wherein writing the first data block further comprises:

searching the used portion of memory for a second data block;

sending an update to the data storage system relating to the second data block; and writing the first data block to the used portion of memory, wherein the writing of the first data block overwrites the second data block.

4. The computer-executable method of claim 3, further comprising, at the data storage system, deciding not to re-cache the second data block on the flash cache module.

5. The computer-executable method of claim 3, further comprising:

returning a response of success to the write request; and re-caching the second data block on the flash cache module.

6. A system, comprising:

a data storage system including a flash cache module, wherein the data storage system is in communication with a data storage array; and computer-executable logic encoded in memory of one or more computers in communication with the data storage system to enable management of the flash cache module in the data storage system, wherein the computer-executable program logic is configured for the execution of:

designating which portions of the flash cache module are enabled to be overwritten during management of the flash cache module;

receiving a request to write a first data block to the flash cache module;

analyzing the flash cache module to determine if there is a free portion of memory on the flash cache module for the first data block;

upon a negative determination, writing the first data block to a used portion of memory on the flash cache module, wherein the data in the used portion of memory is overwritten by the first data block without destaging the used portion of memory;

notifying the data storage system that the used portion of memory on the flash cache module was overwritten;

storing references to overwritten data of the flash cache module to overwrite storage;

analyzing the references to overwritten data to determine which portions of overwritten data will be scheduled to be cached again.

7. The system of claim 6, wherein the computer-executable program logic is further configured for the execution of upon a positive determination, writing the first data block to the free portion of memory.

8. The system of claim 6, wherein writing the first data block further comprises:

searching the used portion of memory for a second data block;

sending an update to the data storage system relating to the second data block; and writing the first data block to the used portion of memory, wherein the writing of the first data block overwrites the second data block.

9. The system of claim 8, wherein the computer-executable program logic is further configured for the execution of:

at the data storage system, deciding not to re-cache the second data block on the flash cache module.

10. The system of claim 8, wherein the computer-executable program logic is further configured for the execution of:

returning a response of success to the write request; and re-caching the second data block on the flash cache module.

11. A computer program product for managing a flash cache module in a data storage system, wherein the data storage system is in communication with a data storage array, the computer program product comprising:

a non-transitory computer readable medium encoded with computer-executable program code for using read signatures in replication, the code configured to enable the execution of:

designating which portions of the flash cache module are enabled to be overwritten during management of the flash cache module;

receiving a request to write a first data block to the flash cache module;

analyzing the flash cache module to determine if there is a free portion of memory on the flash cache module for the first data block;

upon a negative determination, writing the first data block to a used portion of memory on the flash cache module, wherein the data in the used portion of memory is overwritten by the first data block without destaging the used portion of memory;

notifying the data storage system that the used portion of memory on the flash cache module was overwritten; and storing references to overwritten data of the flash cache module to overwrite storage;

analyzing the references to overwritten data to determine which portions of overwritten data will be scheduled to be cached again.

12. The computer program product of claim 11, wherein the code is further configured to enable the execution of upon a positive determination, writing the first data, block, to the free portion of memory.

13. The computer program product of claim 11, wherein writing the first data block further comprises:

searching the used portion of memory for a second data block;

sending an update to the data storage system relating to the second data block; and writing the first data block to the used portion of memory, wherein the writing of the first data block overwrites the second data block.

14. The computer program product of claim 13, wherein the code is further configured to enable the execution of:

at the data storage system, deciding not to re-cache the second data block on the flash cache module.

15. The computer program product of claim 13, wherein the code is further configured to enable the execution of:
returning a response of success to the write request; and
re-caching the second data block on the flash cache module.

* * * * *